United States Patent
Agematsu

(10) Patent No.: US 7,679,244 B2
(45) Date of Patent: Mar. 16, 2010

(54) MOTOR

(75) Inventor: Ikuo Agematsu, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 11/717,321

(22) Filed: Mar. 13, 2007

(65) Prior Publication Data

US 2007/0216243 A1    Sep. 20, 2007

(30) Foreign Application Priority Data

Mar. 17, 2006  (JP) ............................. 2006-073791

(51) Int. Cl.
*H02K 5/16*       (2006.01)
*H02K 7/08*       (2006.01)

(52) U.S. Cl. .............................. 310/90; 310/41; 310/91; 310/94; 310/216.001

(58) Field of Classification Search .................... 310/90, 310/91, 49, 94, 261, 156.01; *H02K 37/04, H02K 15/16*
See application file for complete search history.

(56) References Cited

U.S. PATENT DOCUMENTS

| | | | | |
|---|---|---|---|---|
| 3,936,680 A | * | 2/1976 | Kuwako et al. | 310/40 MM |
| 4,185,214 A | * | 1/1980 | Gerber et al. | 310/51 |
| 4,471,246 A | * | 9/1984 | Paillet | 310/90 |
| 4,482,829 A | * | 11/1984 | Tardieu et al. | 310/105 |
| 6,541,886 B2 | * | 4/2003 | Mayumi | 310/91 |
| 6,989,619 B2 | * | 1/2006 | Hsu | 310/156.56 |
| 7,095,148 B2 | * | 8/2006 | Mayumi | 310/90 |
| 2002/0084709 A1 | * | 7/2002 | Yajima et al. | 310/90 |
| 2006/0220482 A1 | * | 10/2006 | Son et al. | 310/156.08 |
| 2007/0145850 A1 | * | 6/2007 | Hsu | 310/156.56 |
| 2008/0061638 A1 | * | 3/2008 | Lulic | 310/62 |

FOREIGN PATENT DOCUMENTS

WO    WO 2006056262 A1  *  6/2006

* cited by examiner

*Primary Examiner*—Quyen Leung
*Assistant Examiner*—John K Kim
(74) *Attorney, Agent, or Firm*—Reed Smith LLP

(57) ABSTRACT

A motor including a rotor having a rotor shaft and a permanent magnet fixed to an end part of the rotor shaft, a stator disposed around the rotor, a bearing for supporting the end part of the rotor shaft, a bearing holder which holds the bearing movably in an axial direction, and a pressurization member which is disposed on an outer side in the axial direction of the bearing holder for urging the bearing to the rotor shaft side. The permanent magnet is provided with a recessed part which is capable of accommodating the bearing and the bearing holder.

9 Claims, 2 Drawing Sheets

[Fig. 1]
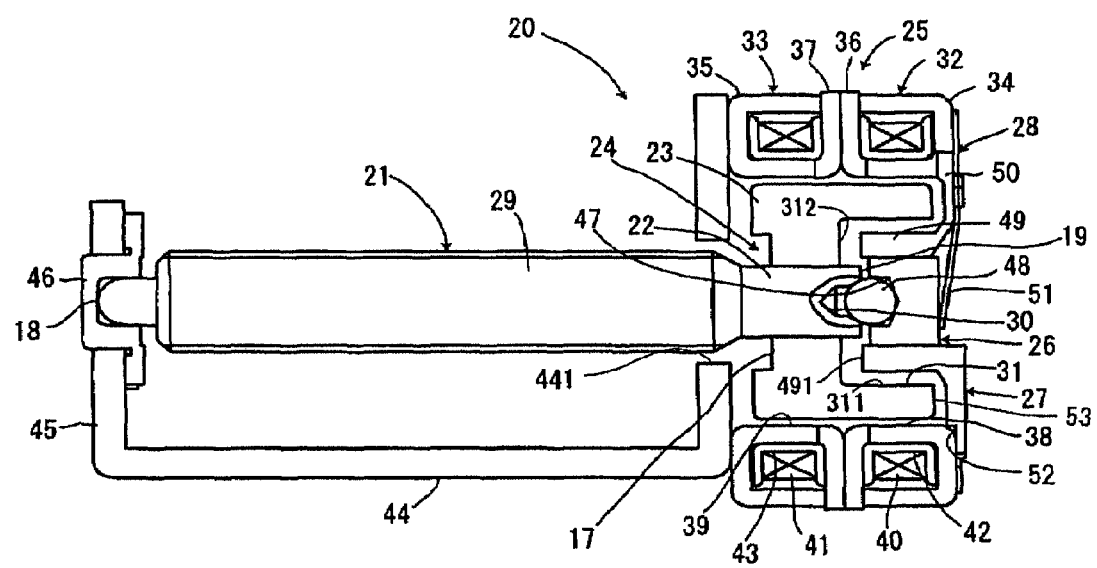
[Fig. 2]
(Prior Art)
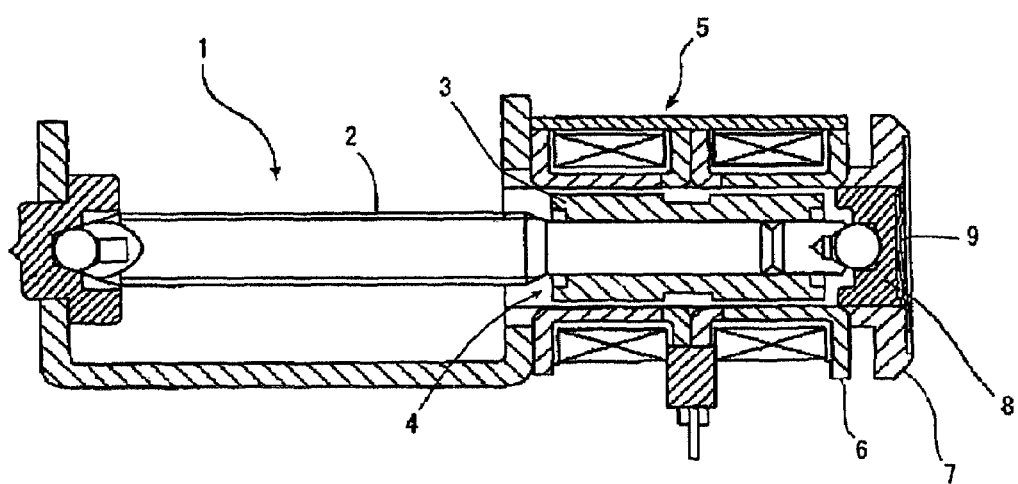

[Fig. 3]
(Prior Art)
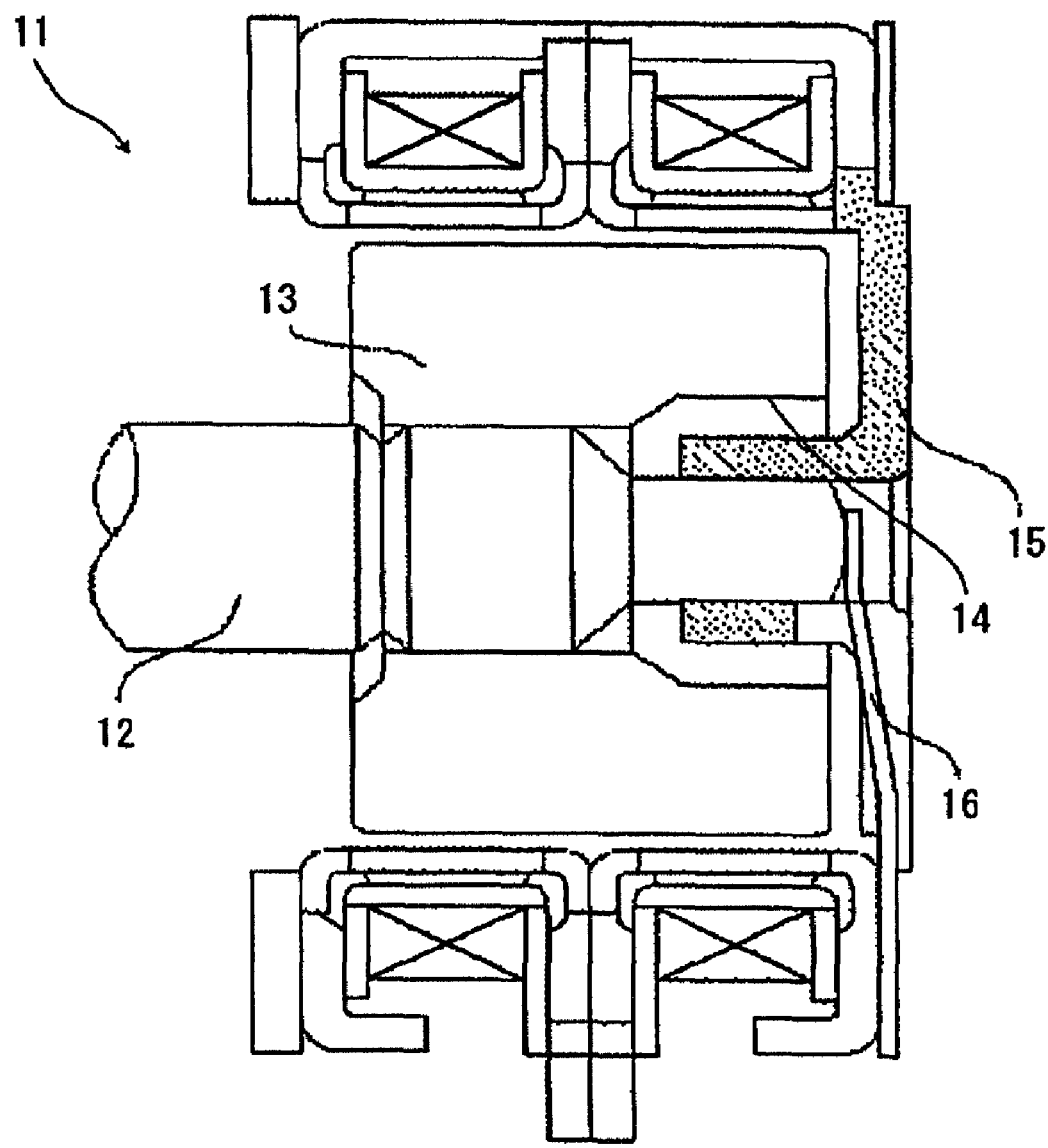

MOTOR

CROSS REFERENCE TO RELATED APPLICATION

The present invention claims priority under 35 U.S.C. §119 to Japanese Application No. 2006-73791 filed Mar. 17, 2006, which is incorporated herein by reference.

FIELD OF THE INVENTION

The present invention relates to a motor which may be used for driving a lens in a camera or the like and, more specifically, to a small motor which is provided with a bearing that is movable in a thrust direction.

BACKGROUND OF THE INVENTION

Small motors have been conventionally used for driving a lens of a digital camera and a video camera, and the like. It has been known to use a motor with a bearing which is movable in a thrust direction as well as a motor without a movable bearing.

A conventional motor 1 is shown in FIG. 2. Referring to FIG. 2, a stator 5 is disposed around a rotor 4 having a permanent magnet 3 which is fixed to a rotor shaft 2, and a bearing holder 7 is fixed to a metal case 6 of a stator 5 so as to be protruded on an outer side in an axial direction. A bearing 8 is movably held to the bearing holder 7. The bearing 8 supports one end of the rotor shaft 2 and is urged on a rotor shaft 2 side by an urging member 9 which abuts with an outer side face in the axial direction of the bearing 8 (see, for example, Japanese Patent Laid-Open No. 2002-191150).

Another conventional motor 11 is shown in FIG. 3. Referring to FIG. 3, a recessed part 14 is formed in a permanent magnet 13 fixed to a rotor shaft 12 and a radial bearing 15 for supporting an outer periphery of one end part of the rotor shaft 12 in a radial direction is accommodated in the recessed part 14. The rotor shaft 12 is urged by a flat spring 16 abutting with a shaft end of the rotor shaft 12 at a position of an axial center of the rotor shaft 12 on the output side of the rotor shaft 12 (see, for example, Japanese Patent Laid-Open No. 2004-140925).

There are, however, problems with the conventional motors discussed above. In particular, in conventional motor 1, since the bearing holder 7 is disposed to protrude on an outer side in the axial direction of the stator 5 and thus an overall length of the motor 1 becomes long and miniaturization of the motor 1 cannot be attained. Therefore, the bearing holder 7 becomes an obstacle when the motor 1 is mounted on an apparatus such as a camera and thus the motor 1 cannot be mounted on an apparatus that requires miniaturization.

Further, the size of the stator 5 occupying the overall length of the motor 1 becomes relatively small and thus an output torque in comparison with a dimension of the motor 1 becomes undesirably small.

Also, in the conventional motor 11, the shaft end of the rotor shaft 12 is directly pressurized by the flat spring 16 and a component force in a radial direction does not occur to the rotor shaft 12. Therefore, shaking in the radial direction of the rotor shaft 12 cannot be restrained and thus knocking noise occurs between the rotor shaft 12 and the radial bearing 15.

SUMMARY OF THE INVENTION

In view of the problems described above, an embodiment of the present invention advantageously provides a motor which is capable of shortening the overall length of the motor or which is capable of increasing size of a stator portion in comparison with the overall length of the motor to increase an output torque in comparison with a dimension of the motor. Further, an embodiment of the present invention advantageously provides a motor in which a rotor shaft is pressurized not only in a thrust direction but in a radial direction to prevent occurrence of knocking noise generated between the rotor shaft and the bearing.

Thus, according to an embodiment of the present invention, there may be provided a motor including a rotor having a rotor shaft and a permanent magnet which is fixed to an end part of the rotor shaft, a stator which is disposed around the rotor, a bearing for supporting the end part of the rotor shaft, a bearing holder which holds the bearing movably in an axial direction, a pressurization apply member which is disposed on an outer side in the axial direction of the bearing holder for urging the bearing to the rotor shaft side, and a recessed part which is formed in the permanent magnet so as to be capable of accommodating the bearing and the bearing holder.

In accordance with an embodiment of the present invention, a recessed part is formed in the permanent magnet so as to be capable of accommodating the bearing and the bearing holder and thus a length in an axial direction of the motor can be shortened. Therefore, the motor can be mounted even on an apparatus where miniaturization is required and thus use of the motor can be expanded. Accordingly, the size of the stator in the overall length of the motor is not required to be made smaller and thus a high output torque in comparison with the dimension of the motor can be obtained.

In accordance with an embodiment, the bearing which is held in the bearing holder movably in the axial direction is accommodated into the recessed part which is formed in the permanent magnet.

Further, in accordance with an embodiment, the rotor shaft is provided with an output shaft which is protruded from the stator, and an outer diameter of the end part of the rotor shaft to which the permanent magnet is fixed is smaller than an outer diameter of the output shaft of the rotor shaft. According to the structure as described above, volume of the recessed part which is formed in the permanent magnet can be set larger without changing the outer diameter of the output shaft and thus a space for accommodating the bearing and the bearing holder can be largely secured. Further, it is preferable that an outer diameter of the bearing is set to be roughly equal to the outer diameter of the end part of the rotor shaft. According to the structure as described above, a ratio of the length in the axial direction of the bearing to the outer diameter of the bearing can be set larger and thus, even when the bearing is pressurized by a pressurization apply member at a position apart from an axial center of the rotor shaft, an inclination angle of an axial center line of the bearing to the axial center line of the rotor shaft is restrained and thus the rotor shaft is stably supported without shaking.

Further, it is preferable that the bearing which is held on an inner periphery of the bearing holder is formed of resin material which contains another material for enhancing strength of the bearing. According to the structure as described above, the strength of the bearing is enhanced and thus abrasion or deformation due to sliding movement in the thrust direction of the bearing in the bearing holder can be prevented. Further, in a case that the bearing and the bearing holder are formed of resin material having same coefficient of thermal expansion, the resin material which forms the bearing preferably contains another material for preventing the bearing from adhering to an inner peripheral face of the bearing holder.

In addition, it is preferable that the permanent magnet is structured of a rare earth magnet which is formed by compression molding or injection molding. According to the structure as described above, a thickness in a radial direction of the permanent magnet can be made thinner while necessary magnetic performance is maintained.

In addition, it is preferable that a depth of the recessed part which is formed in the permanent magnet is set in a range of substantially ¼ to ¾ of a length in the axial direction of the permanent magnet.

In addition, it is preferable that the pressurization apply member is provided with a flat spring part which abuts with the bearing at a position apart from an axial center of the rotor shaft. According to the structure as described above, the rotor shaft is pressurized in the thrust direction and, in addition, also pressurized in the radial direction by a component force of the pressurizing force. Therefore, shaking in the radial direction of the rotor shaft is restrained and thus occurrence of knocking noise between the rotor shaft and the slide bearing is prevented.

In accordance with an embodiment, the bearing may support the end part of the rotor shaft through a spherical body which is provided between a shaft end of the rotor shaft and the bearing or through a convex curved face part formed at the shaft end of the rotor shaft.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several FIGURES, in which:

FIG. 1 is a cross-sectional view showing a motor in accordance with an embodiment of the present invention.

FIG. 2 is a cross-sectional view showing a conventional motor.

FIG. 3 is a cross-sectional view showing another conventional motor.

DETAILED DESCRIPTION OF THE PREFERRED EMBODIMENTS

A motor in accordance with an embodiment of the present invention will be described below with reference to the accompanying drawings. FIG. 1 is a cross-sectional view showing a motor in accordance with an embodiment of the present invention. In this embodiment, the present invention is applied to a stepping motor but it is not limited to the stepping motor.

As shown in FIG. 1, a stepping motor 20 in accordance with an embodiment of the present invention includes a rotor 24 having a rotor shaft 21 and a permanent magnet 23 which is fixed to an end part 22 of the rotor shaft 21, a stator 25 which is disposed around the rotor 24, a slide bearing 26 for supporting an shaft end 19 of the rotor shaft 21, a bearing holder 27 which movably holds the slide bearing 26 in a thrust direction, and a pressurization apply member 28 which is provided on an outer side in an axial direction of the bearing holder 27.

An output shaft 29 protruding on the other side from the stator 25 is formed in the rotor shaft 21 and a lead screw is formed in an outer periphery of the output shaft 29. A screw part (not shown) of a head member in an apparatus to which the stepping motor 20 is mounted is threadedly engaged with the lead screw. The screw part of the head member is movable in the axial direction, i.e., a right and left direction in FIG. 1, by rotating the output shaft 29. An outer diameter of the end part 22 of the rotor shaft 21 is formed thinner or a small diameter than an outer diameter of the output shaft 29 and the permanent magnet 23 is fixed to the end part 22 which is the small diameter portion. Further, the rotor shaft 21 is formed with a recessed part 30 having a conical recessed face at a shaft end of the end part 22 and a shaft end 18 of the output shaft 29 is formed in a convex curved face. Alternatively, the shaft end 18 of the output shaft 29 may be formed in a recessed part having a conical recessed face in the same way as the end part 22 of the rotor shaft 21 and a steel ball is disposed between the thrust bearing 46 and the shaft end 18.

The permanent magnet 23, which is formed by compression molding or injection molding, is structured of a rare earth magnet such as neodymium. A recessed part 31 which is capable of accommodating the slide bearing 26 and the bearing holder 27 is formed in an end part 53 of the permanent magnet 23. Another recessed part is formed in the other end part 17 of the permanent magnet 23 and this another recessed part is used as an adhesive retaining portion for an adhesive for fixing the permanent magnet 23 to the end part 22 of the rotor shaft 21. The recessed part 31 which is formed in the end part 53 of the permanent magnet 23 includes an inner peripheral face 311 and a bottom face 312 for forming the recessed part 31. The bottom face 312 is formed in a size which is capable of accommodating the slide bearing 26 and a cylindrical holding part 49 of the bearing holder 27 that slidably holds the slide bearing 26. A depth of the recessed part 31 is preferably in a range of ¼ to ¾ of the length in the axial direction of the permanent magnet 23 and the most preferable depth of the recessed part 31 is about ½ of the length in the axial direction of the permanent magnet 23. In the case that the depth of the recessed part 31 is smaller than ¼ of the length in the axial direction of the permanent magnet 23, an accommodating space for the slide bearing 26 and the cylindrical holding part 49 of the slide bearing 26 becomes too small. On the contrary, in the case that the depth of the recessed part 31 is larger than ¾ of the length in the axial direction of the permanent magnet 23, fixing dimension of the permanent magnet 23 to the end part 22 which is the small diameter portion of the rotor shaft 21 is not sufficient. In accordance with an embodiment, an edge part of the recessed part 31 of the permanent magnet 23 may be chamfered to avoid the permanent magnet 23 to be hurt when it abutted with the bearing holder 27.

In this embodiment, the slide bearing 26 is held in a state that its outer peripheral face is contacted with an inner peripheral face of the bearing holder 27 and the roughly entire slide bearing 26 in the depth direction is accommodated within the recessed part 31. In the cylindrical holding part 49 of the bearing holder 27 which slidably holds the slide bearing 26, the roughly entire portion of the cylindrical part is accommodated within the recessed part 31. Further, a fixing part 50 of the bearing holder 27 is not accommodated in the recessed part 31 and it is fixed to an inner peripheral portion of an outer stator core 34. In accordance with an embodiment, it is preferable that the roughly entire portion in the axial direction of the slide bearing 26 is accommodated within the recessed part 31, but a part of the slide bearing 26 and a part of the holding part 49 of the bearing holder 27 may be accommodated in the recessed part 31.

It is preferable that a lubricant is coated between the bearing 26 and the holding part 49 of the bearing holder 27.

The stator 25 is structured of two sets of metal stator cores 32 and 33 which are superposed each other in the axial direction. The respective stator cores 32 and 33 are structured of outer stator cores 34 and 35 disposed on outer sides in the axial direction and inner stator cores 36 and 37 adjacently disposed each other. The outer stator cores 34, 35 and the inner stator cores 36, 37 are formed of a magnetic metal member, and a plurality of pole teeth 38 and 39 are erected and formed on the inner periphery of the respective stator cores so as to face an outer peripheral face of the permanent magnet 23 of the rotor 24. Further, the respective outer stator cores 34, 35 and the inner stator cores 36, 37 are provided with coil bobbins 42, 43 made of resin around which coils 40, 41 are wound. The respective pole teeth 38 which are formed in the outer stator core 34 and the inner stator core 36 are alternately disposed side by side in a circumferential direction on the inner peripheral face of the coil bobbin 42. Further, the respective pole teeth 39 which are formed in the outer stator core 35 and the inner stator core 37 are alternately disposed side by side in a circumferential direction on the inner peripheral face of the coil bobbin 43.

A metal frame 44 which is bent in a "U"-shape is fixed on an end face of the outer stator core 35 by a fixing method such as spot-welding. The shaft end 18 of the output shaft 29 is rotatably supported by a thrust bearing 46, which is fitted to a bent portion 45 on the other end part side of the frame 44, to rotatably support the rotor shaft 21. Further, the bearing holder 27 which holds the slide bearing 26 rotatably supporting the shaft end 19 that is one end part of the rotor shaft 21 is disposed on an end face of the outer stator core 34. Further, the frame 44 is formed with an opening 441 for inserting the rotor shaft 21.

The slide bearing 26 which supports the shaft end 19 of the end part 22 of the rotor shaft 21 is formed of resin material, i.e., formed of resin such as polybutylene terephthalate (PBT) or polyphenylene sulfide (PPS). The resin material contains another material which is different from the resin material such as glass fiber, carbon fiber and composite material which is blended with potassium titanate fiber (Potassium Titanate Compound) to enhance its strength as a bearing. Since the strength of the slide bearing 26 made of the above-mentioned material is enhanced, abrasion and deformation of the slide bearing 26 due to sliding on the bearing holder 27 in a thrust direction can be prevented. Further, the slide bearing 26 is formed in a cylindrical shape whose outer diameter is set to be roughly the same as that of the end part 22 of the rotor shaft 21 and a recessed part 47 having a conical recessed face is formed in the inside of the slide bearing 26 in its axial direction. A steel ball 48 formed in a spherical shape is provided between the recessed part 47 and a recessed part 30 formed at the shaft end of the end part 22 of the rotor shaft 21. In this manner, the rotor shaft 21 is supported by the slide bearing 26. In this case, not shown specifically, a protruded part for preventing turning in a circumferential direction may be formed on the outer periphery of the slide bearing 26.

The bearing holder 27 is provided with the holding part 49 formed in a cylindrical shape for holding the outer periphery of the slide bearing 26 and a fixing part 50 which is formed in a flat ring shape and extended on an outer side in the circumferential direction from an outer side portion in the axial direction of the holding part 49. The cylindrical holding part 49 is capable of being accommodated within the recessed part 31 of the permanent magnet 23 while the cylindrical holding part 49 slidably holds the slide bearing 26. In other words, the outer diameter of the end face 491 in the axial direction of the cylindrical holding part 49 is set to be smaller than the outer diameter of the bottom face 312 which forms the recessed part 31 of the permanent magnet 23. Therefore, the end face 491 in the axial direction of the cylindrical holding part 49 faces the bottom face 312 of the permanent magnet 23. In addition, the bearing holder 27 is fitted and fixed to the end part in the axial direction of the outer stator core 34 while a stepped part 52 formed in the fixing part 50 is used as a positioning part for the bearing holder 27 and thus the bearing holder 27 can be assembled with a high degree of accuracy.

The bearing holder 27 is formed of resin material and, similarly to the slide bearing 26, formed of resin such as polybutylene terephthalate (PBT) or polyphenylene sulfide (PPS). Further, in order to prevent from generating a gap space between the outer periphery of the slide bearing 26 and the bearing holder 27 due to thermal expansion, the bearing holder 27 is preferably formed of resin material having the same coefficient of thermal expansion as that of the slide bearing 26. Further, in order to prevent the outer peripheral face of the slide bearing 26 from adhering to the inner peripheral face of the holding part 49 of the bearing holder 27, it is preferable that resin material of the slide bearing 26 contains another material, which is different from the bearing holder 27, in other words, the slide bearing 26 preferably contains material such as glass fiber or carbon fiber.

The pressurization apply member 28 is made of a metal plate and is formed in a roughly circular plate shape to cover an outer face of the bearing holder 27. Four pawl parts (not shown) are formed at outer peripheral edge part of the pressurization apply member 28 and the respective pawl parts are engaged with the outer peripheral edge part of the outer stator core 34. The fixing part 50 of the bearing holder 27 is sandwiched between the pressurization apply member 28 and the end part of the outer stator core 34 and thus the bearing holder 27 is fixed to the stator 25. A roughly center portion of the pressurization apply member 28 is formed with a flat spring part 51 which is cut and bent on the slide bearing 26 side. The flat spring part 51 is abutted with the outer face in the axial direction of the slide bearing 26 at a position which is apart outside from the axial center line of the rotor shaft 21. In this embodiment, the flat spring part 51 is formed in a straight-line manner. However, the flat spring part 51 may be formed such that the flat spring part 51 is bent in an opposite direction to a bending direction of its root portion at a middle of the flat spring part 51 and the tip end of the bent portion is abutted with the outer face in the axial direction of the slide bearing 26.

In the motor 20 in accordance with an embodiment of the present invention, the slide bearing 26 and the holding part 49 of the bearing holder 27 are accommodated within the recessed part 31 of the permanent magnet 23 and thus the length in the axial direction of the motor can be shortened. Therefore, the motor 20 in this embodiment can be mounted on an apparatus where miniaturization is required and thus use of the motor can be expanded. Further, even when the above-mentioned structure is adopted, the size of the stator in the overall length of the motor is not required to make smaller and thus a high output torque in comparison with the dimension of the motor can be obtained.

In the motor 20 in accordance with an embodiment of the present invention, the flat spring part 51 pressurizes the slide bearing 26 at a position which is apart from the axial center line of the rotor shaft 21. Therefore, the rotor shaft 21 is pressurized in the thrust direction and, in addition, also pressurized in the radial direction by a component force of the pressurizing force. Accordingly, shaking in the radial direction of the rotor shaft 21 is restrained and thus occurrence of knocking noise between the rotor shaft 21 and the slide bearing 26 can be prevented.

In addition, the slide bearing 26 is formed thinner than the conventional slide bearing, in other words, the outer diameter of the slide bearing 26 is set to be roughly same as the outer diameter of the end part 22 of the rotor shaft 21 and the depth of the recessed part 31 of the permanent magnet 23 is set in a range of ¼ to ¾ of the length in the axial direction of the permanent magnet 23. Therefore, the ratio of the length in the axial direction of the slide bearing 26 with respect to the outer diameter of the slide bearing 26 can be set larger than that of the conventional slide bearing. Accordingly, even when the slide bearing 26 is pressurized by the flat spring part 51 at a position largely apart from the axial center line of the rotor shaft 21, an inclination angle of the axial center line of the slide bearing 26 to the axial center line of the rotor shaft 21 is restrained and thus the rotor shaft 21 is stably supported without shaking.

Further, the bearing holder 27 is made of resin and the fixing part 50 of the bearing holder 27 is sandwiched between the pressurization apply member 28 and the outer stator core 34 to be fixed to the stator 25. Therefore, assembling and manufacturing processes are simplified and manufacturing cost can be reduced.

In the embodiment described above, the rotor shaft 21 is supported by the slide bearing 26 through the steel ball 48. However, the present invention is not limited to this embodiment. In other words, the shaft end 19 of the end part 22 of the rotor shaft 21 may be formed in a convex curved shape to be directly and rotatably fitted to the recessed part 47 of the slide bearing 26.

Further, glass fiber and carbon fiber which are contained in the slide bearing 26 may be glass fiber and carbon fiber comprised of needle crystal (crystal whisker).

Further, in the embodiment described above, the present invention is applied to a stepping motor but may be applied to a motor other than a stepping motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor having a rotor shaft and a permanent magnet which is fixed to an end part of the rotor shaft;
   a stator which is disposed around the rotor;
   a bearing for supporting the end part of the rotor shaft in an axial direction;
   a bearing holder which is provided with a cylindrical holding part for holding the bearing movably in the axial direction;
   a pressurization member which is disposed on an outer side in the axial direction of the bearing holder for urging the bearing to the rotor shaft side; and
   a recessed part which is formed in the permanent magnet, in which the bearing and the cylindrical holding part of the bearing holder are accommodated;
   wherein the rotor shaft penetrates one side of the permanent magnet into the recessed part so that an end portion of the rotor shaft, defined as that portion of the rotor shaft which is located inside the recessed part of the permanent magnet, has an axial length which is shorter than an axial length of the recessed part formed in the permanent magnet;
   wherein both the bearing and the cylindrical holding part of the bearing holder are accommodated within the recessed part formed in the permanent magnet so that the end portion of the rotor shaft faces the bearing in the axial direction; and
   wherein the bearing is movably held in the axial direction by the cylindrical holding part in a state that the bearing is urged by the pressurization member and thus the end part of the rotor shaft is supported by the bearing in the axial direction.

2. The motor according to claim 1;
   wherein the rotor shaft is provided with an output shaft which is protruded from the stator, and an outer diameter of the end part of the rotor shaft to which the permanent magnet is fixed is smaller than an outer diameter of the output shaft of the rotor shaft.

3. The motor according to claim 2;
   wherein an outer diameter of the bearing is set to be roughly equal to the outer diameter of the end part of the rotor shaft to which the permanent magnet is fixed.

4. The motor according to claim 1;
   wherein the bearing is held on an inner peripheral face of the bearing holder and the bearing is formed of resin material which contains another material for enhancing strength of the bearing.

5. The motor according to claim 1;
   wherein the bearing is held on an inner peripheral face of the bearing holder,
   wherein the bearing and the bearing holder are formed of resin material having same coefficient of thermal expansion, and
   wherein the resin material which forms the bearing contains another material for preventing the bearing from adhering to an inner peripheral face of the bearing holder.

6. The motor according to claim 1;
   wherein the permanent magnet is structured of a rare earth magnet which is formed by compression molding or injection molding.

7. The motor according to claim 1;
   wherein a depth of the recessed part which is formed in the permanent magnet is set in a range of substantially ¼ to ¾ of a length in the axial direction of the permanent magnet.

8. The motor according to claim 1;
   wherein the pressurization apply member is provided with a flat spring part which abuts with the bearing at a position apart from an axial center line of the rotor shaft.

9. The motor according to claim 1;
   wherein the bearing supports the end part of the rotor shaft through a spherical body which is provided between a shaft end of the rotor shaft and the bearing or through a convex curved face part formed at the shaft end of the rotor shaft.

* * * * *